United States Patent [19]

Kramer

[11] Patent Number: 5,246,477
[45] Date of Patent: Sep. 21, 1993

[54] APPARATUS FOR THE ARCHING OF GLASS SHEETS HEATED TO THE SOFTENING TEMPERATURE

[75] Inventor: Carl Kramer, Aachen, Fed. Rep. of Germany

[73] Assignee: WSP Ingenieurgesellschaft fur Waermetechnik, Stroemungstechnik und Prozesstechnik mit beschraenkter Haftung, Aachen, Fed. Rep. of Germany

[21] Appl. No.: 999,664

[22] Filed: Dec. 30, 1992

Related U.S. Application Data

[63] Continuation of Ser. No. 651,833, Feb. 7, 1991, abandoned.

[30] Foreign Application Priority Data

Feb. 8, 1990 [DE]  Fed. Rep. of Germany ....... 4003828
Oct. 22, 1990 [EP]  European Pat. Off. ......... 90120245.7

[51] Int. Cl.⁵ ............................................ C03B 23/023
[52] U.S. Cl. ........................................ 65/273; 65/107; 65/245; 65/268; 65/289
[58] Field of Search ................. 65/107, 245, 253, 273, 65/275, 286, 287, 289, 268; 198/782, 826

[56] References Cited

U.S. PATENT DOCUMENTS

| | | | |
|---|---|---|---|
| 977,987 | 12/1910 | Willson | 198/826 |
| 3,701,644 | 10/1972 | Frank . | |
| 3,856,499 | 12/1974 | Frank . | |
| 4,218,232 | 8/1980 | Wilhelm | 65/106 |
| 4,586,946 | 5/1986 | Kramer et al. | 65/273 |
| 4,723,983 | 2/1988 | Erdmann et al. | 65/273 |
| 4,773,925 | 9/1988 | Schultz | 65/253 |

FOREIGN PATENT DOCUMENTS

| | | |
|---|---|---|
| 0114168 | 7/1987 | European Pat. Off. . |
| 1679961 | 2/1967 | Fed. Rep. of Germany . |
| 2331584 | 12/1974 | Fed. Rep. of Germany . |
| 2532318 | 4/1976 | Fed. Rep. of Germany . |
| 2621902 | 12/1976 | Fed. Rep. of Germany . |
| 3150859 | 12/1981 | Fed. Rep. of Germany . |
| 2221409 | 11/1974 | France ................................. 65/107 |

Primary Examiner—Joye L. Woodard
Attorney, Agent, or Firm—Shea & Gould

[57] ABSTRACT

The invention relates to an apparatus for the preferable two-dimensional arching of glass sheets heated to the softening temperature comprising a following cooling section, the horizontal guiding of the glass sheets taking place on a plurality of movable transport rods and rollers which form a horizontal surface. The transport rods are provided in two groups which project outwardly from a respective mounting at the two lateral edges of the roller hearth furnace into the roller hearth furnace surface; the two groups of the transport rods are pivotal by a pivot movement via their respective mountings downwardly between linear forming elements, in particular forming rods, the joint upper tangential surface of which corresponds to the contour of the lower side of the arched glass sheet. Alternatively, at least one edge region of some transport rods may be pivoted upwardly to arch glass sheets or panes having one or two bends, for example bus windows or display case panes.

14 Claims, 8 Drawing Sheets

APPARATUS FOR THE ARCHING OF GLASS SHEETS HEATED TO THE SOFTENING TEMPERATURE

This application is a continuation of application Ser. No. 07/651,833, filed Feb. 7, 1991, now abandoned.

BACKGROUND OF THE INVENTION

1. Field of the Invention

The invention relates to an apparatus for the arching of glass sheets heated to the softening temperature comprising a plurality of movable transport rods for the planar glass sheet which form a horizontal support surface and a plurality of forming elements which are adjustable to the desired contour of the glass surface to be arched.

2. Description of the Prior Art

From German patent specifications 1,679,961 and 2,331,584 apparatuses for doming or arching glass sheets or panes at softening temperature are known in which the arch shape is constituted by means of bent rods. Each rod can be pivoted about an axis extending through its two ends. On such pivot movement, an arching or curving of the glass sheet results which depends on the shape of the rod. If gravity is not adequate for the necessary change of shape, additionally a bending force can be obtained by pressing the sheet against a counter form or against counter rollers which are formed similarly to the forming rods. A disadvantage with such apparatuses is the problem regarding the exact maintaining of the position of the bending axis, because there is no possibility of guiding the edges. Moreover, apparatuses of this type can only be used to a limited extent for architectural glass because in this case it is not possible to operate with a constant usually cylindrical radius of curvature, as for example in the case of the side windows of automobiles; instead, a changing radius of curvature is required. This radius of curvature is usually substantially smaller than in cylindrically curved trays or sheets for automobile glazing in which the radii are usually more than 800 mm. In contrast, the radii of curvature with architectural glass may sometimes only be 100 to 300 mm. These radii of curvature cannot be achieved with the known apparatuses. Moreover, often a cylindrical curvature has to be generated only in one strip and the surfaces of the glass sheet bordering said strip remain planar. Such glass sheets are used in the architectural area for example for forming outer corners in glass facades or also for bar glazing, shower cabins, etc. Such glass sheets cannot be curved with the known apparatuses either.

Further known apparatuses, as described for example in BE-2,621,902, are also not suitable for making such glass panes or sheets. In this apparatus the glass sheet runs onto upwardly convexly curved forming rods whose insert magnitude of the bending line increases in the passage direction. In this case, the only bending force is gravity. Theoretically, this apparatus could be used for producing the described bends with two straight legs and an internal curvature. However, in practice almost insurmountable difficulties would occur with regard to the guiding of the glass sheet. In addition, to obtain the planar legs for each necessary curvature a separate set of complicatedly configured forming rods would be required.

U.S. Pat. No. 3,856,499 discloses an apparatus for arching glass planes having two sets of forming rollers which are arranged vertically above each other in the vertical direction and comprise concave and convex surfaces. The two forming roller sets can be displaced relatively to each other so that the glass sheet introduced between the rollers is deformed in a manner similar to that between a pair of forming rollers. Apart from the poor optical quality which is achieved with such a rolling bending method, with narrow radii in this apparatus a great difference arises in the peripheral speed of the rollers with respect to the glass transported between the rolling nip formed by the rollers. Moreover, for each glass sheet form a new forming roller set must be made available and this is disadvantageous with regard to investment costs, resetting expenditure and the like.

The apparatus according to U.S. Pat. No. 3,701,644 has similar disadvantages in the bending of optically satisfactory architectural glasses.

A further apparatus for curving or arching glass sheets heated to softening temperature is known from German patent 2,532,318. In this case the forming rods are constituted by a core and a rotatable driven outer sheath or a sleeve. For transporting the still planar glass sheets into the apparatus the curved forming rods are pivoted into the horizontal position so that a horizontal transport plane arises. For initiating the bending operation the curved forming rods are pivoted downwardly. The actual arching is achieved by raising the entire system upwardly with the forming rods and pressing it against a counter form.

This known principle is also applicable only to relatively large bending radii because for small bending radii the principle of the driven external shell cannot be continuously implemented because on each revolution said shell must participate in the fibre shortening between the external radius and internal radius. Moreover, with this apparatus it is not possible to generate with a universal forming set bendings with a radius of curvature varying transversely of the transport direction and with straight legs. Finally, due to the kinematics of the principle employed the use of this apparatus is also restricted theoretically to relatively large bending radii.

Finally, German patent 3,150,859 and the equivalent European patent 0 114 168 should be mentioned and disclose an apparatus in which the glass sheet to be curved is transported on straight transport rods from a furnace into the bending apparatus. This apparatus comprises a horizontal guide for the glass sheets to be arched. The horizontal surface necessary for the horizontal guiding is formed by transport rods and rollers for the glass sheet to be arched, the transport rods being movable. The known apparatus comprises in an arched region a plurality of forming rods. The forming rods are adjustable to the desired contour of the glass sheet to be arched. For direct arching of the glass sheet a forming apparatus having a pressure apparatus is provided which can apply an application pressure to the centre of the glass sheet to be arched. Whilst the application pressure of the pressure means subject the glass sheet heated to the softening temperature to a central load, the transport rods are moved away vertically downwardly beneath the glass sheet. In this manner, the glass sheet to be arched comes into the region of influence of the forming rods and is pressed by the pressure means onto the forming rods. In this apparatus the transport rods and the forming rods have a core and a rotatable driven outer shell.

A disadvantage of this known apparatus is that the arching of coated glasses is not possible because the pressing means formed as pressure roller and coming into direct contact with the glass surface damages such a coating. Moreover, the production of arched glass sheets with straight legs in the region of which the deformed glass sheet remains planar is not possible because in precisely this region the sheet to be deformed initially rests on the forming rods. The support action of the straight transport rods which could ensure the desired planarity is thus initially lost precisely in this region.

SUMMARY OF THE INVENTION

The invention therefore has as its object the provision of an apparatus for arching glass sheets heated to the softening temperature wherein the aforementioned disadvantages do not occur.

The invention therefore proposes in an apparatus for the arching of glass sheets heated to the softening temperature comprising a plurality of movable transport rods for the planar glass sheet which form a horizontal support surface and a plurality of forming elements which are adjustable to the desired contour of the glass surface to be arched the improvement in which the transport rods are provided in two groups and project from their respective mounting at the two lateral edges of a roller hearth furnace into the roller hearth furnace surface, and the two groups of transport rods are pivotal by a pivot movement via their respective mountings downwardly between the linear forming elements.

Advantageous forms of embodiment are set forth in the subsidiary claims.

In accordance with the invention the transport rods are arranged in two groups which project outwardly from a respective mounting on the two lateral edges of the roller hearth furnace into the roller hearth furnace surface. The two groups of the transport rods are pivotal downwardly by a pivot movement about their respective mountings.

The advantages achieved with the apparatus configured according to the invention are based on the following mode of operation: a glass sheet emerging from a furnace is transported over the transport rods forming in their initial position a planar roller hearth furnace into the arching region. As this happens, the glass sheet emerging from the furnace is heated to the softening temperature, i.e. it is plastically deformable but is still in its planar basic form.

After the trailing edge of the glass sheet to be arched has entered the deformation region, the transport rods combined in two groups and mounted respectively at the edges of the roller hearth furnace pivotal about an axis pointing in the transport direction pivot downwardly. The sheet then sags in the centre and comes to rest on the forming elements disposed beneath the transport rods. The pivot movement of the transport rods ends in a lower position in which the tangential plane spanned by the transport rods itself runs into the forming surface in turn spanned by the linear forming elements, for example forming rods, the latter being arranged respectively between the transport rods. As a result, during the entire bending operation the sheet is provided with an exact planar guiding in its edge region. This is extremely important in particular for architectural sheets or panes because the latter are made almost exclusively from rectangular glass sheets and an extremely high importance is attached to the parallelism and plane form of the edges of the finished bent and prestressed glass.

Since the glass sheet rests on the transport rods during the entire bending operation a special drive for the rollers or sleeves guiding the glass sheet over the linear forming elements is not absolutely essential. Such a drive can for example be achieved in that the forming elements are made from flexible shafts which are driven in usual and known manner. In the case of stiffer glass sheets in which either by the greater glass thickness or by a relatively low temperature the flexural strength is still such that the gravity alone does not suffice for bringing the sheet to rest on the forming bed, a deformation force can be exerted by lateral guide rollers. Said lateral guide rollers are arranged respectively above or between the transport rods and guide the glass sheet to be arched at its longitudinal edges in a manner similar to a wheel flange. Said guide rollers are preferably likewise combined in groups and can be adjusted in the axial direction of the transport rods synchronously with the pivoting down of the latter so that the bending axis can also be exactly positioned with respect to the glass sheet to be deformed.

To enable the lateral guide rollers to be adjusted without excessive expenditure it is advantageous for the transport rods to be coupled to the guide rollers via a constrained guiding, for example a cam disc or comparable mechanism. This makes it possible to adjust the guide rollers synchronously with the pivot movement of the transport rods. The gravity defines the bending direction for the glass pane or sheet to be arched and the guide rollers overcome the resistances present for example with relatively thick glass sheets and thus contribute to the bending operation.

The lateral guide rollers ensure at the same time the desired flatness of the lateral legs of the arched or curved glass sheet.

Preferably, the guide rollers are combined in two groups, one of which is arranged on the right and the other on the left along a line pointing in the transport direction on both sides of the glass sheet to be deformed. The two groups of guide rollers may be adjusted separately or for example jointly via a cam disc or plurality of identical cam discs jointly with the transport rollers.

It may however also be expedient to effect the adjustment of the guide rollers on one side of the apparatus kinematically, i.e. by form-locking means, whilst on the other side the application of the guide rollers is by means of an adjustable force. In this manner, an exact position of the sheet on the forming bed defined by the forming rods can be achieved and at the same time account taken of the production-dependent width tolerance of the sheets to be bent.

The pivot movement of the transport rods about their axis is advantageously employed to effect the displacement of the lateral guide rollers by means of an also pivoted cam disc and a frame-fixed cam roller. The cam disc, which must correspond to the bending form and width of the glass sheet to be bent, establishes the clear kinematic relationship.

It is in particular expedient to arrange on both sides of the apparatus for each bearing strip of the transport rollers two cam discs and cam rollers or followers. The mounting of the cam rollers may in particular be in the region of the frame construction also carrying the bearings for the rotation.

The lateral guide rollers and the rollers which are carried by the linear forming elements are subjected to particular loads. It has therefore proved extremely advantageous to make these rollers from compacted silicate fibre material of high compressive strength and high resistance to abrasion. Particularly preferred is the material Calit 434 or a similar material. This material is for example made by the company Segliwa GmbH, Wiesbaden.

The glass sheet to be arched is further transported by the transport rods during the entire bending operation. Thus, the form change does not take place at only one point in the apparatus according to the invention but on the contrary continuously over the length thereof. This means that the apparatus must be made a certain distance longer than the maximum length of the glass sheet to be bent.

The fact that in the apparatus according to the invention the transport of the glass sheet is in the direction of the generatrices of the bending cylinder, i.e. in the direction of the long axis of the glass sheet, is advantageous for the optical appearance of the bent panes. For here the minimum inevitable optical distortions due to the rollers have no effect because reflections at the vertically installed sheets are transversely of said possible disturbances.

An essential advantage of the apparatus according to the invention is also that it can be adjusted relatively simply to all possible bending shapes. For this purpose, the lifting elements engaging vertically on the linear forming elements are employed and, for example controlled by a microcomputer, permit the adjustment of the desired bending form in the shortest possible time. This microcomputer also performs the determination of the optimum position of the pivot axis for the two groups of transport rods. For a predetermined bending line this position can be determined easily by simple geometrical relationships. It is achieved in this manner that the operator of the system in each case need only then enter the main dimensions in the computer by means of a menu program stored in the microcomputer, said dimensions defining the form of the glass sheet to be bent. The calculation of all the operating data and the corresponding adjustment of the apparatus then take place automatically.

The control of the lateral guide rollers is performed mainly by the cam disc so that the microcomputer is relieved of the corresponding control tasks.

In a similar manner the bent support rods for the glass sheet in the tempering section and in the removal table are displaced. In the prestressing or tempering section nozzle arms are disposed in the free spaces between the bent support rods. At a suitable point said nozzle arms comprise a joint so that the tempering nozzle field can be adapted to a wide range of glass sheet curvatures. The adaptation of the form of the nozzle arms to the bending form of the glass is by securing the support or holding means of the nozzle arms to the lifting elements which serve to adjust the bent support rods. Arranged exactly above the nozzle arms at the upper side of the glass sheet are nozzle ribs which like the nozzle arms are provided with an aperture nozzle system for maximum heat transfer. Said nozzle ribs likewise consist of segments which are connected together by means of pivot joints. By pivoting the nozzle rib sections about said joints, as by pivoting the nozzle arms about the fulcrums at the sheet lower side, adaptation to the glass sheet form in a large range of bendings can be achieved.

The adjustability of the nozzle arms on the lower side of the glass and of the nozzle ribs on the upper side of the glass requires the connection of the supply passages for the nozzle ribs or nozzle arms by means of the flexible conduits.

To bend sheets which, like for example bus windows, have only one bend, or have two bends, for example show cases, the regions of the sheets adjacent each bend or between the two bends being substantially straight or only slightly bent, the previously described bending technique with downwardly pivotal straight transport rollers can be modified to a technique in which the transport rollers are pivoted upwardly out of the plane defined by the substantially straight transport rollers. Such pivotal transport rollers may for example be provided for the production of bus panes on one side of the apparatus or for making show cases on both sides of the apparatus.

By corresponding adaptation of the pivot angles and/or the lengths of the pivot shafts a high flexibility is achieved in the arch forms to be obtained. This is also promoted by the fact that the pivot angles and/or the lengths of the pivot shafts can be made different on both sides of the apparatus in order to implement certain unusual arch forms.

Both bus windows and show case panes have as a rule only weakly curved regions between the bends, i.e. the bending radii are very large; such large bending radii of the usually only weakly bent straight regions of the sheets can be implemented by a corresponding profiling of the transport rollers and/or the pivot shafts.

Since bus or show case panes are usually very long and very large in size, the bending of said panes should be carried out at elevated temperature, i.e. in a furnace. For this purpose, it is only necessary to lengthen the roller section of the furnace accordingly so that the mounting of the cantilever short pivot shafts can be accommodated outside the furnace, i.e. "in the cold".

For the straight transport rollers formed corresponding to the bending form a mounting can be chosen as usual for example in continuous furnace plants. The transport rollers are placed with their ends disposed in the cold on driven stub shafts. The drive of said positioned transport rollers is by frictional engagement, i.e. they are entrained on rotation of the stub shafts.

In the previously described construction of the apparatus for arching continuously curved glass sheets as well with long sheet sizes it is advantageous to reduce the heat loss of the sheet in the bending apparatus by heating the apparatus. Such a heating may for example be effected by electrical radiant heaters which are mounted above and possibly also below the pivot rollers. Said radiant heaters effect in particular a preheating of the pivot rollers and additionally reduce the thermal irradiation of the sheet. The control of the radiators is with the aid of the sequence control of the plant in such a manner that the desired power is available when the sheet enters the apparatus.

BRIEF DESCRIPTION OF THE DRAWINGS

The invention is described in more detail hereinafter with the aid of examples of embodiment with reference to the accompanying schematic drawings. In the drawings

DESCRIPTION OF THE PREFERRED EMBODIMENTS

Figure 1:
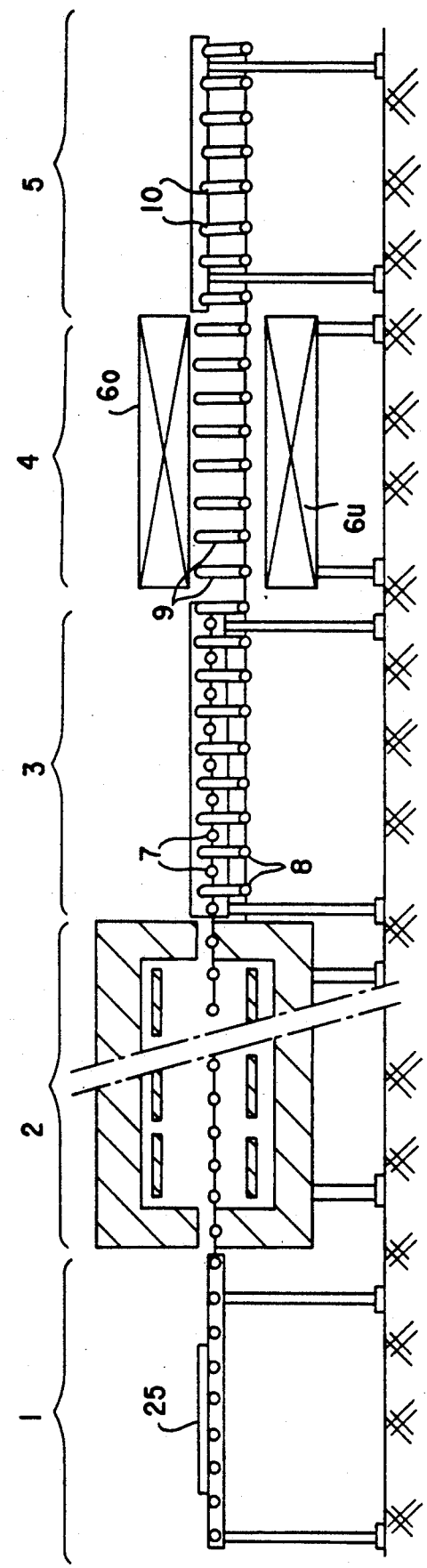
FIG. 1 shows a schematic longitudinal section of an overall plant including the apparatus according to the invention.

As can be seen from FIG. 1, the overall plant comprises a conventional feed table 1 on which a glass sheet 25 is placed. The heating of the glass sheet 25 to the softening temperature is effected for example in a roller hearth furnace 2. The furnace 2 is followed by a deformation or arching station 3. Following the deformation station there is a cooling or tempering section 4 and thereafter a removal region 5 for the bent and cooled glass sheet. In the cooling section two air supply boxes for an upper nozzle system 6o and a lower nozzle system 6u are indicated. In the deformation section 3 the linear forming elements 8, that is forming rods, can be seen which are located beneath the roller hearth furnace of straight transport rods 7 with rotatable sleeves, said hearth furnace being horizontal in its initial position. Similarly formed support rollers or support rods 9 and 10 with rotatable sleeves are located, respectively, in the cooling section 4 and as conveying devices 10 in the removal region 5.

Figure 2:
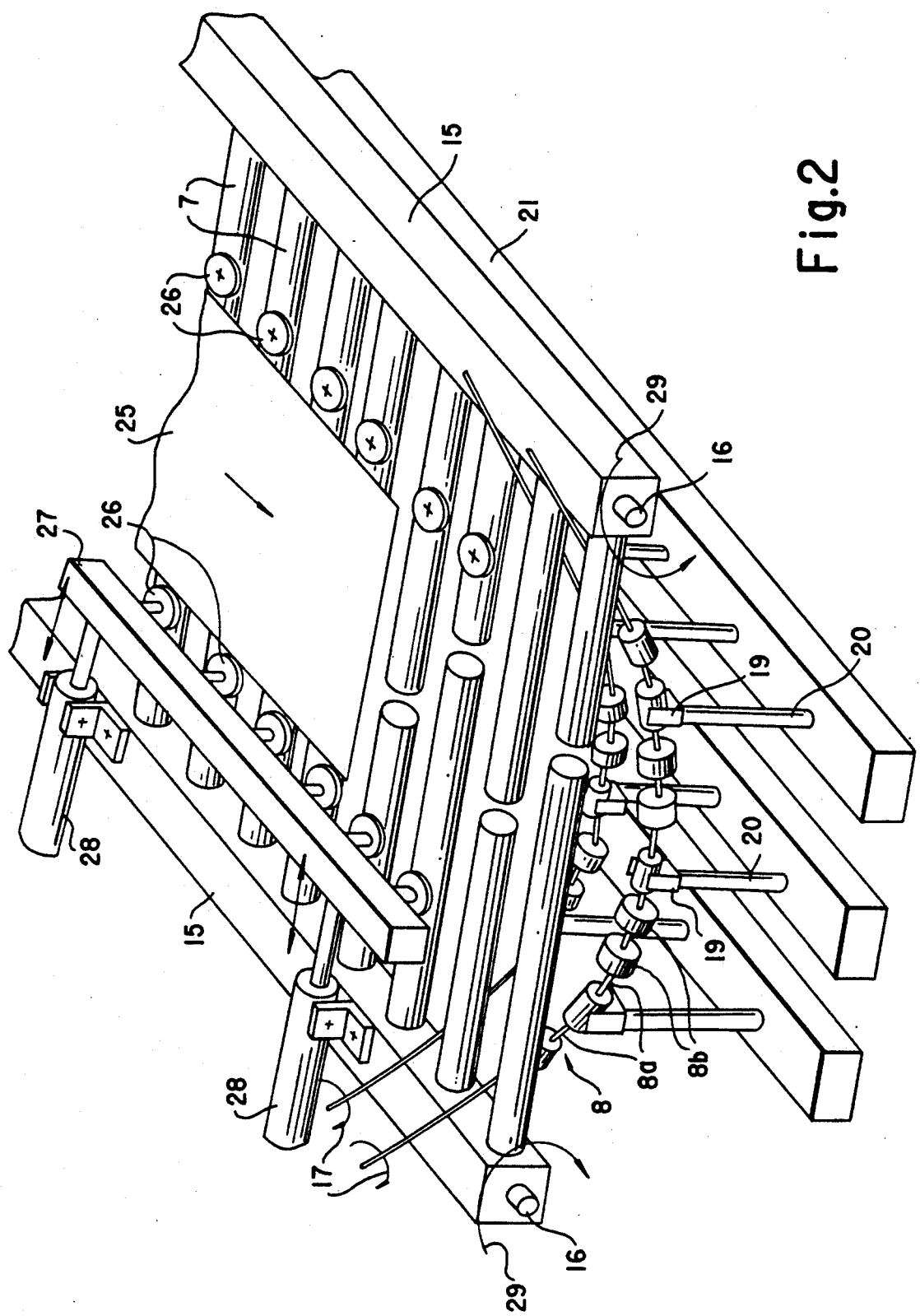
FIG. 2 shows a simplified perspective view of the deformation station according to the invention.

Substantial constructional details of an advantageous embodiment of the deformation station will be apparent from the perspective schematic sketch according to FIG. 2. This diagram shows only one longitudinal portion of the apparatus. The straight transport rods 7 are mounted in bearing beams 15 which are secured by means of journals 16 or similar mountings to the frame of the apparatus. For clarity in the Figure the frame itself is not shown. The drive of the transport rods 7 is preferably accommodated in or on the bearing beams 15. It is not necessary to illustrate the details of the drive because only known techniques are employed therefor.

Between the straight transport rods 7 forming rods 8 are disposed which form the forming bed and the cores of which consist of flexible shafts 8a. As apparent from FIG. 2, on the flexible shafts 8a numerous rollers 8b are mounted via which the glass sheet is guided in the bent state. The flexible shafts 8a are likewise driven. This is indicated in the Figure by the rotation arrows 17. No details of this drive are illustrated because such a drive corresponds to the prior art.

At support points 19 lifting rods 20 are mounted on the forming elements 8. Said lifting rods 20 are mounted on beams 21 arranged in the longitudinal direction of the apparatus. This makes it possible by vertical adjustment of the beams 21 to effect the vertical adjustment of all support points 19 lying in said vertical longitudinal section. A rotation arrow indicates the movement direction of the glass sheet 25 heated to the softening temperature. Said pane or sheet 25 is not yet bent in FIG. 2 because it still rests on the transport rods 7 in the planar starting position. It is already guided by the lateral guide rollers 26. On the left side of the apparatus according to FIG. 2 the mounting of said guide rollers 26 in a bearing strip 27 can be seen, the latter being adjustable by means of adjustment members 28 in the axial direction of the transport rods 7. On the right side this bearing strip 27 including the adjusting mechanism is omitted for reasons of clarity. The adjusting members 28 are mounted on the bearing beam 15 for the straight transport rods.

Now, when the sheet 25 has entered the apparatus in its entire length the straight transport rods 7 are folded by a rotary movement of the bearing beams 15 about the bearing journals 16 downwardly as indicated by the rotation direction arrow 29 and the sheet 25 comes to bear on the forming elements 8 which have previously been adjusted to the desired form by corresponding vertical movement of the lifting rods 20. The lateral guiding by the rollers 26 by means of the adjusting elements 28 follows the movement of the sheet edges on the transport rods 7. This achieves the result that the sheet 25 on conclusion of the bending operation rests exactly in the desired region on the forming elements 8. It may be expedient to produce the adjustment of the guide rollers 26 on one side of the apparatus kinematically, i.e. by form-locking means, whilst on the other side the application of the guide rollers 26 is by means of an adjustable force. In this manner an exact position of the sheet can be obtained on the forming bed defined by the forming rods 8 and at the same time account can be taken of the production-dependent width tolerances of the panes or sheets to be bent. During the bending operation the sheet 25 is further transported by the transport rods 7 and by the likewise driven rollers 8b of the forming elements in the direction towards the cooling section 4.

Figure 6:
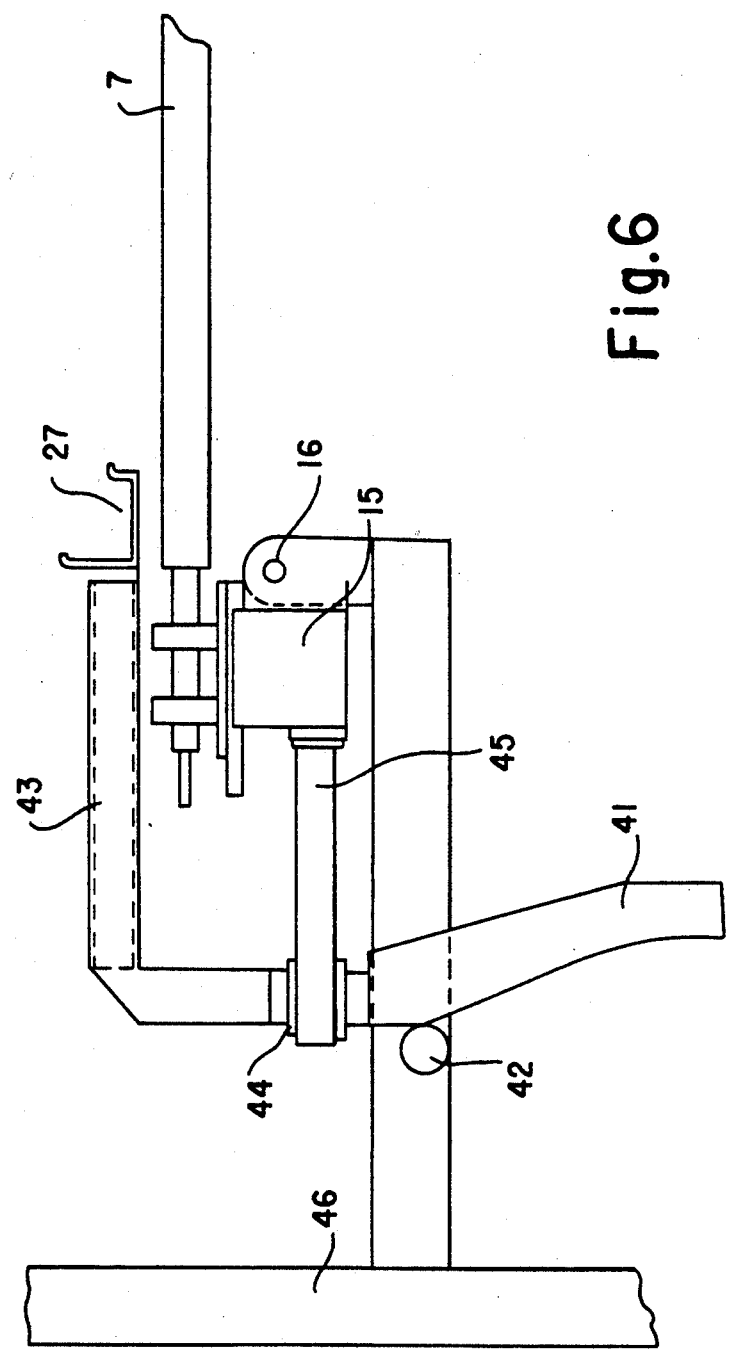
FIG. 6 is a schematic view of a mechanical guide means for the lateral guide rollers using a cam disc.

A further possibility of implementing the deforming station 3 resides, as indicated in FIG. 6, in utilizing the pivot movement of the transport rods 7 about the fulcrums 16 to generate by means of a likewise pivoted cam disc 41 and a frame-fixed cam roller 42 the displacement which is otherwise produced with the adjusting elements 28. For this purpose, the support structure 43 of the bearing strip 27 fixedly connected to the cam disc 41 is used, said strip being displaced with the push sleeve 44 on the push rod 45 in accordance with the cam disc form and pivot angle of the bearing beam 15. The easily interchangeable cam disc, which must correspond to the bending form and width of the glass sheet 25 to be bent, then establishes the clear kinematic relationship. Of course, it is expedient then to arrange on both sides of the apparatus for each bearing strip 27 two cam discs and cam rollers in each case. The region of the frame structure 46 which also carries the bearings for the journals 16 is particularly suitable for mounting the cam rollers.

Figure 3:
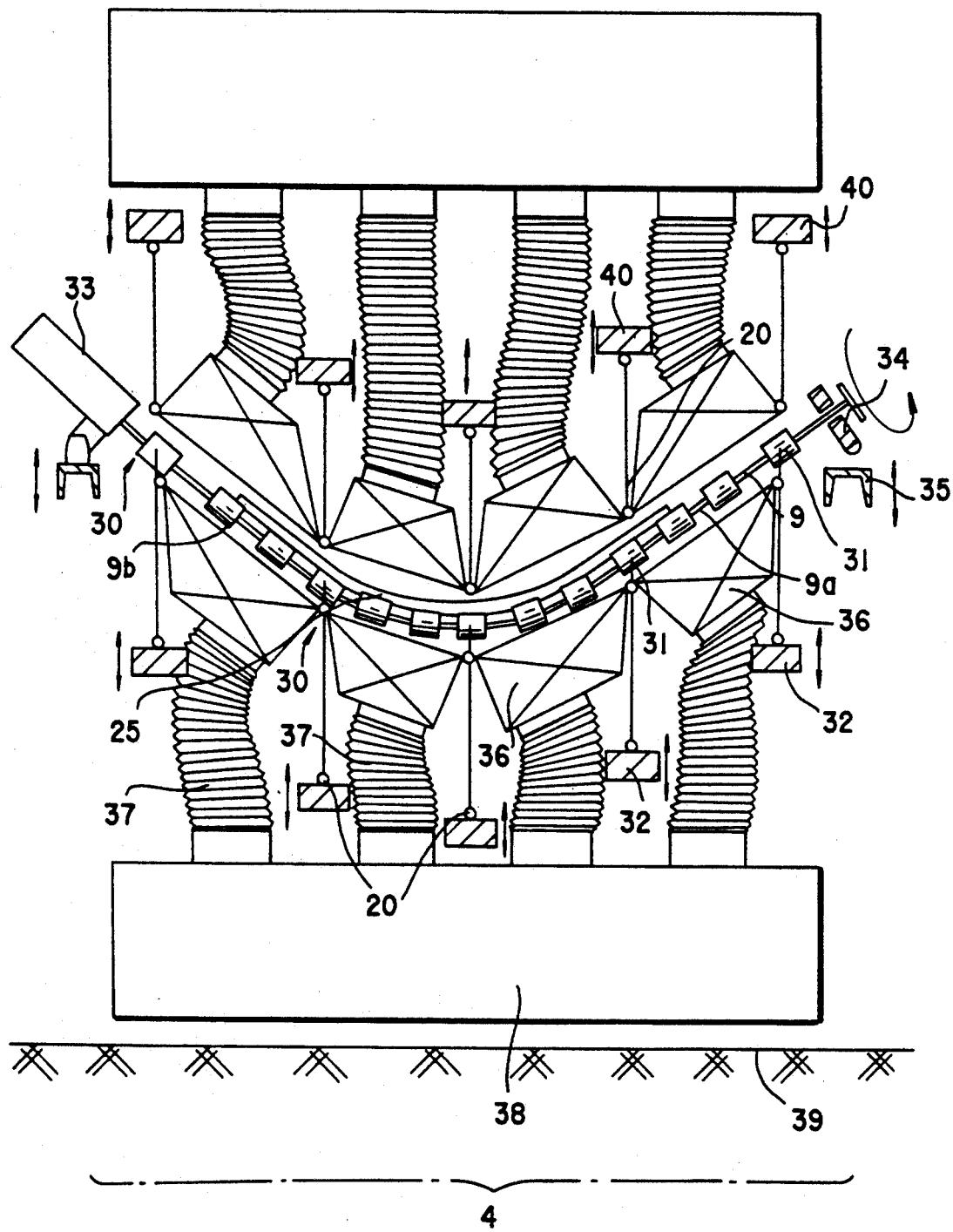
FIG. 3 is a schematic cross-section through the cooling or tempering section.

In the cooling section 4, FIG. 3, the sheet 25 is transported over curved elements 9 similar to the forming rods 8 in the bending section. Said curved elements 9 consist in an advantageous embodiment of the apparatus of a flexible shaft 9a which is driven at one or both end(s) and of rollers 9b which are mounted on said flexible shaft 9a and which carry the glass sheet 25. At suitable support points 30 support members 31 are again arranged which can be jointly vertically adjusted in groups with lifting beams 32. The length compensation of the flexible shaft 9a is for example in a clamping means 33 equipped with a helical spring. Said clamping means 33 represents at the same time the loose bearing of the flexible shaft 9a. Said clamping means 33 and the fixed bearing 34 are each mounted on a respective bearing strip 35 vertically adjustable with respect to the frame of the apparatus, which is not shown in FIG. 3.

Between the support points 30 nozzle boxes 36 are mounted on the lifting rods 20 and are fed by means of flexible hoses 37 from an air supply box 38 disposed beneath the apparatus over the support floor 39. A similar structure is disposed at the upper side. If the vertical adjustment movement of the upper lifting beams 40 is coupled to that of the lower beams, a single vertical adjustment suffices for both sides. In this manner a prestressing section is obtained which can be adapted to the specific pane forms within very wide limits very simply and without modification.

Figure 4:
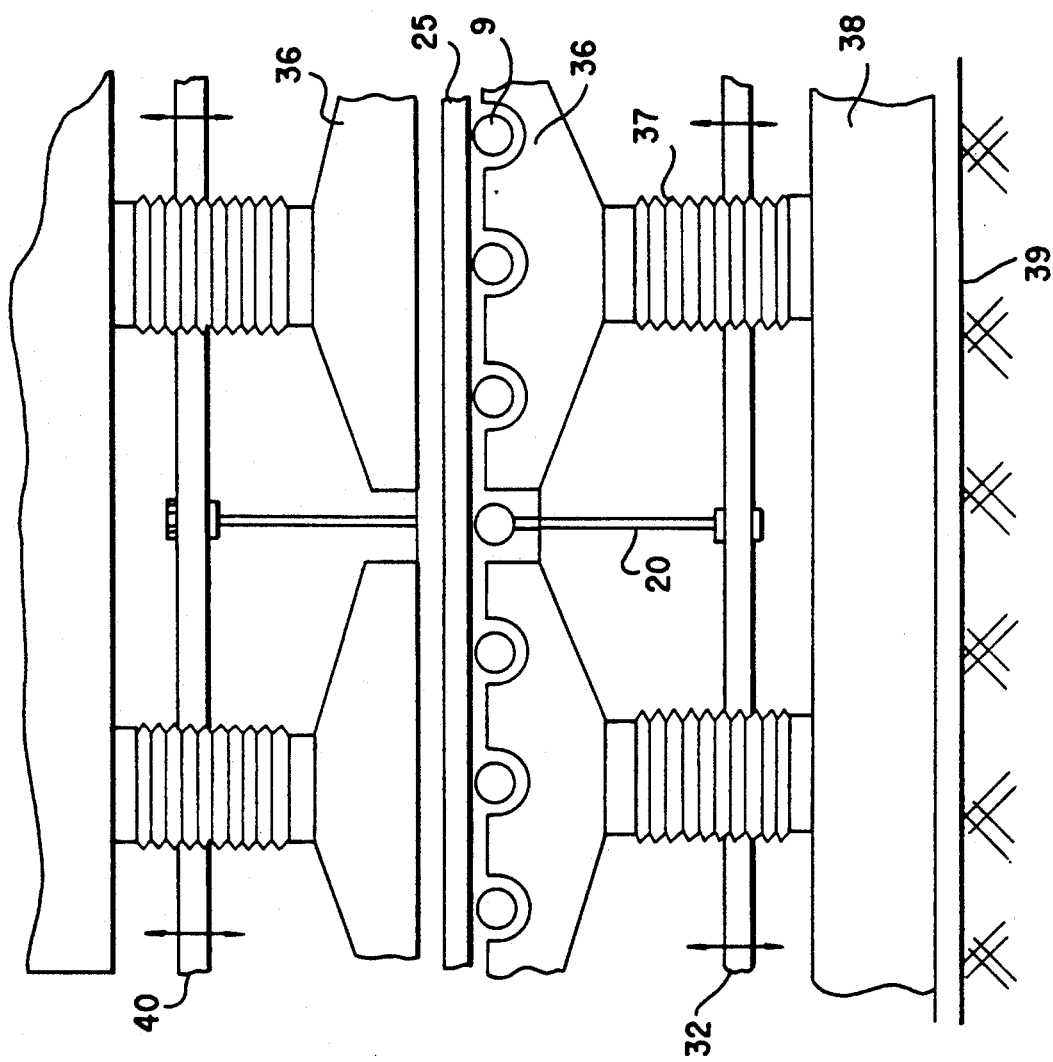
FIG. 4 is a schematic longitudinal section through the cooling section.

It is also to be seen from the longitudinal section in FIG. 4 that the nozzle boxes 36 on the lower side of the glass sheet 25 expediently contain recesses for the curved elements 9. In this manner a smaller distance can be achieved between nozzles and glass surface. To ensure a uniform supply, with lower pressure loss, of the nozzle boxes 36 with the necessary cooling air it is advisable to supply a long nozzle box with a plurality of flexible hoses 37. If a long nozzle box is divided into several shorter nozzle boxes the air supply is effected with one or a low number of flexible hoses 37, depending on the space available.

It is important for the width of the nozzle boxes 36 to be matched to the form of the polynomes to be implemented by means of the support points and describing the contour of the bent pane. There are two constructional possibilities for this.

If the connection to the support members 31 is implemented in the form of simple joints, the lifting rods 20 connecting the support points to the lifting beams 32 must likewise be articulately mounted on the latter. The support bearings of the flexible shaft in this case should not be displaceable on said shaft. This situation is shown in FIG. 3. On a variation of the bending form the support members 31 do not move exactly vertically at the shafts 9a or at the joints between the nozzle boxes 36 but at the same time execute a pivotal movement. The advantage of this construction resides in that the gap between the nozzle boxes 36 can be made with minimum width. This solution is indicated schematically in FIG. 4.

Another solution resides in that the support points 31 are only vertically moved, i.e. are rigidly connected to the lifting beams 32. This requires that the width of the nozzle boxes must not be greater than the minimum chord length between the support points 31 with slight sagging. Apart from a rotational movement, the support points of the nozzle boxes must also permit a sliding movement. As a result, the gap between the nozzle boxes increases with increasing sagging. To avoid a disturbance of the cooling effect due to this gap the nozzle jets must then be correspondingly inclined at the edges of the nozzle boxes so that in spite of this gap the glass sheet is uniformly influenced.

The great advantage of this apparatus resides in that as already mentioned no form change at all or complicated assembly operations are necessary for setting the apparatus to a great variety of archings of the glass sheets 25. It is moreover possible to control the entire apparatus with a microcomputer. This reduces the necessary resetting times on changing the bending form to a few minutes. A further great advantage is that even after conclusion of the bending operation the clean planar guiding of the side edges is retained. As likewise already mentioned, this is important in particular in architectural panes which are mounted in frames. Moreover, of course the suspension points of the tongs for the holding of the glass panes inevitable in vertical bending and tempering methods are of course dispensed with.

Figure 5:
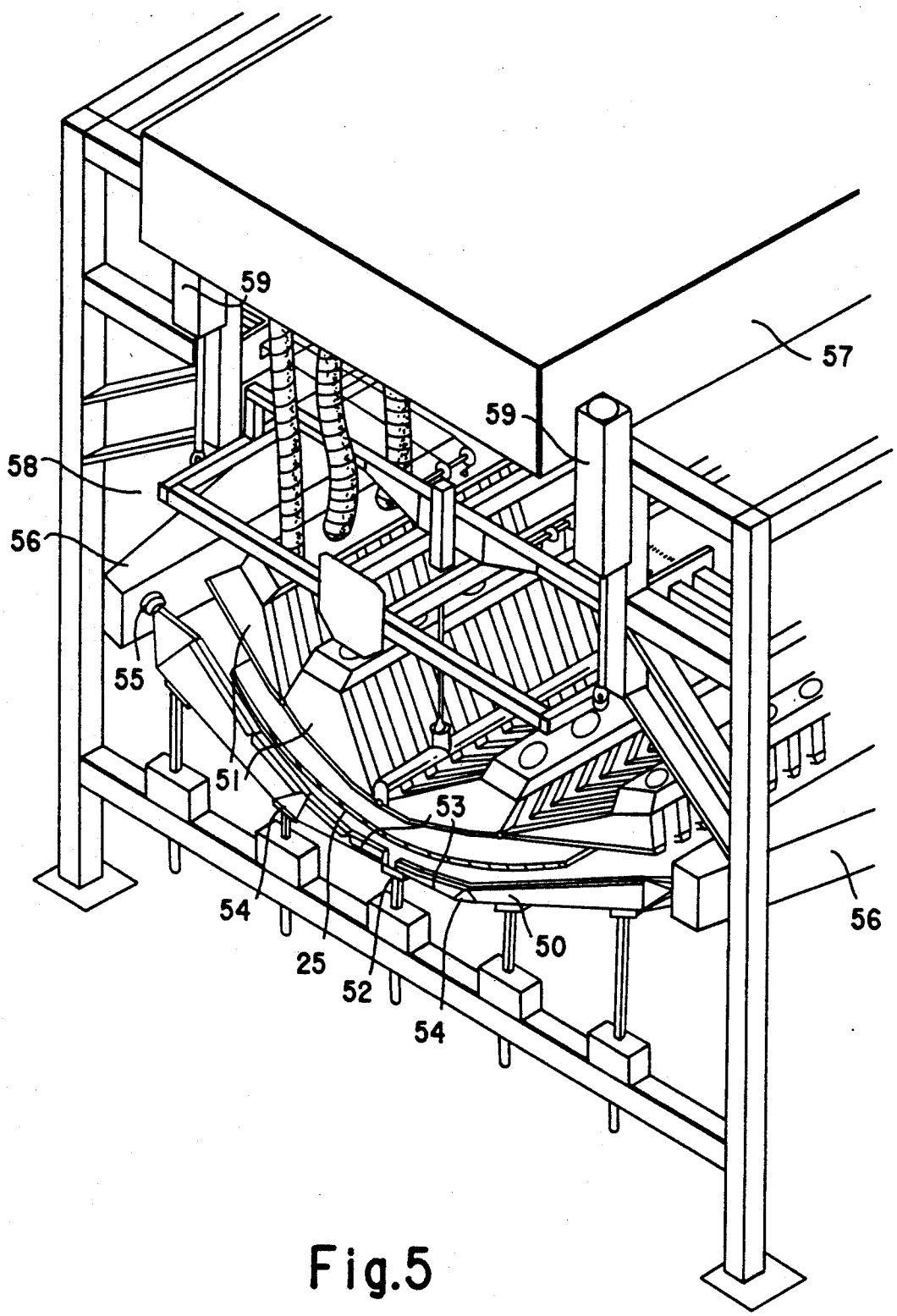
FIG. 5 is a perspective lateral view of a further embodiment of the cooling section.

A further particularly advantageous embodiment of the cooling section according to FIG. 5 employs an aperture nozzle system designed for maximum heat transfer and comprising nozzle arms 50 and nozzle ribs 51. The nozzle arms 50 are arranged for supporting the glass sheet 25 beneath said arched glass sheet 25 between the bent curved elements which consist of the flexible shafts 9a equipped with rollers 9b. They are connected to the curved support points for adjusting the form of said transport elements; in FIG. 5 the transport rods are not shown in order to improve clarity of the illustration. The center support point 52 represents a stop for the end pieces 53 of the nozzle arms 50 which are pressed by the nozzle pressure obtaining on operation of the cooling section automatically against said stop. The elastic connection 54 between said pivotal end portion 53 of the nozzle arms 50 and the part thereof connected to the outer support points is by means of an elastic folding bellows. The nozzle arms 50 in turn are connected with flexible hose connections, 55 to the air manifold boxes 56 disposed on either side of the apparatus. Now, when glass breaks in the apparatus the air supply is shut off by means of flaps (not shown). The end pieces of the nozzle arms 50 drop downwardly, the glass can slide inwardly on the inclined nozzle arms and forming rods and drop out of the apparatus downwardly between the forming rods.

Above the glass pane four nozzle rib segments 51 are disposed which are suspended vertically adjustably by means of cables and rods. With the aid of the vertical adjustment and the articulations between the segments the form of the nozzle field corresponding to the bending form of the glass sheet 25 with the necessary accuracy can be set in a wide range. The connection to the air manifold box 57 disposed above the apparatus is again through flexible hoses. The entire upper nozzle system is suspended in a frame 58 which for better accessibility in the case of glass breakage can be rapidly raised by mean of suitable lifting elements; in FIG. 5 pneumatic cylinders 59 are shown.

Figure 7:
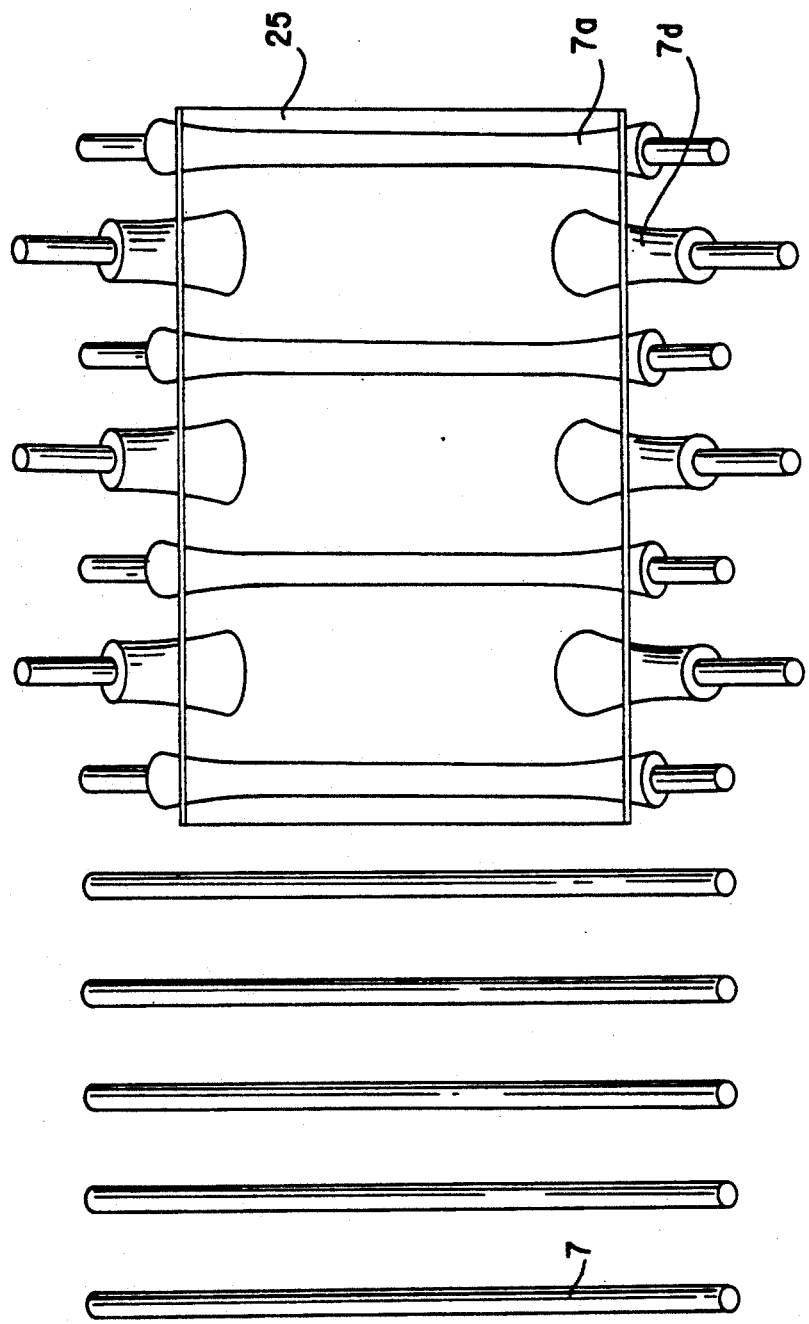
FIG. 7 is a simplified perspective view corresponding to FIG. 2 of a further embodiment of a deformation station.

FIG. 7 shows an alternative deforming station 3 cooperating with a conventional reversing furnace 2 and having substantially straight transport rollers 7a which can be used to make bus or shop case panes, i.e. generally panes which have only one bend or two bends and between or adjacent the bends have only substantially straight or slightly curved regions. To generate these only weakly curved regions between the bends the transport rollers 7a are correspondingly profiled in the manner indicated in FIG. 7.

Figure 8:
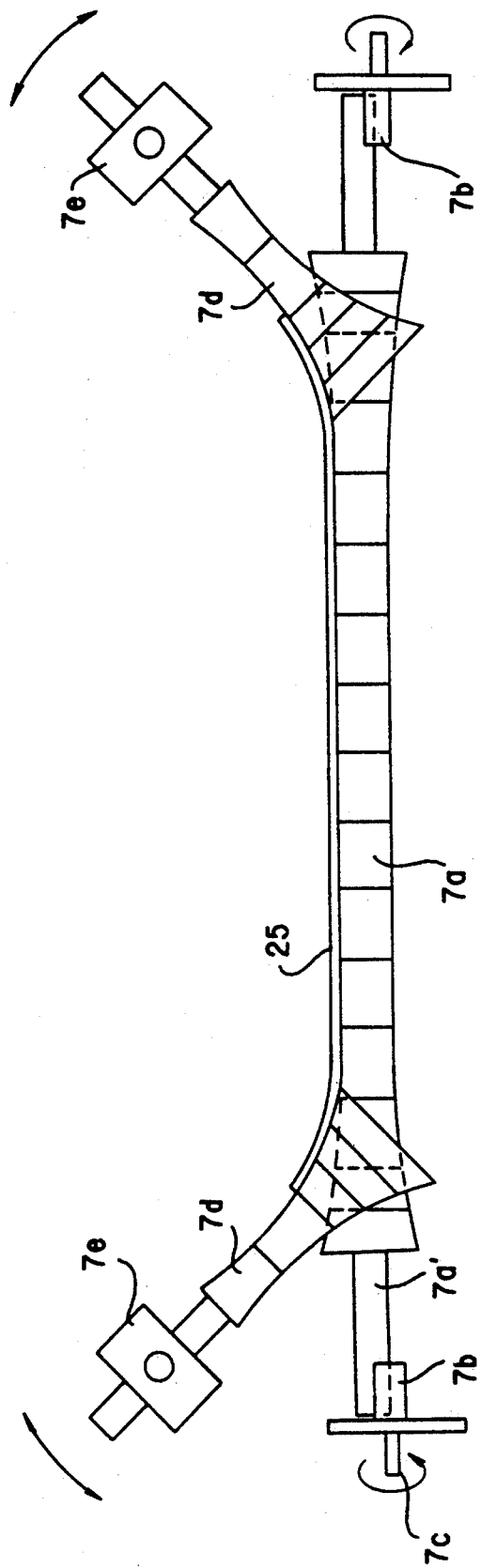
FIG. 8 is a longitudinal section through the edge region of the arching station according to FIG. 7.

As apparent in particular from FIG. 8, the long straight transport rollers 7a are mounted on driven stub shafts 7b which are disposed spaced from the actual deforming region. This makes it possible to accommodate the alternative deforming station in a furnace so that the deformation can be carried out at the necessary elevated temperatures. For this purpose, the roller run of the furnace is correspondingly lengthened so that the short stub shafts 7b can be arranged outside the furnace, i.e. "in the cold".

The straight transport roller 7a lie with their cylindrical ends 7a in each case on two stub shafts 7b so that due to the weight of the transport rollers 7a and the glass pane 25 a force locking or friction locking results; the straight transport rods 7a are thereby entrained on rotation of the stub shafts 7b.

The drive for the stub shafts 7b is denoted in FIG. 8 by the reference numeral 7c and also includes the mounting of the stub shafts 7b and thus of the straight transport rollers 7a.

In the alternative deforming station shown in FIGS. 7 and 8 the short transport and forming rollers 7d located according to the illustration in the Figures on the right side between the transport rollers 7a respectively are upwardly pivotal by their combination 7e of mounting and drive being upwardly swingable through a predetermined angle in accordance with the illustration of FIG. 8. This results in a deformation of the edge region of the glass sheet 25 resting on the rollers 7d can be seen in FIG. 8.

To permit this pivot movement of the edge region of the transport rollers 7d and the corresponding formation of a bend in the glass sheet 25, it is expedient to configure the mounting of the short transport and forming rollers 7d in comb-like manner so that the tines of the comb-like mounting engage between the bearing points of the straight transport rollers 7a.

It is also possible to make the transport rollers 7a rigid in their central region and deformable in the edge region to permit this pivot movement of the edge region.

In the embodiment according to FIGS. 7 and 8 the bearing beam 15 (see FIG. 2) for the right ends of the transport rollers 7a, 7d are formed in two parts as "segment comb" so that the stationary part retains its normal planar working position whilst the movable part is pivoted upwardly in accordance with the illustration of FIG. 8.

As an alternative to this it is also possible to pivot all the transport rollers 7 upwardly. Finally, the operations can be carried out with alternating conditions from stationary transport rollers to pivotal transport rollers if the mounting thereof is formed accordingly.

A corresponding pivot movement can also be provided at the opposite side of the alternative deforming station should glass sheets 25 having two bends be desired.

The deforming station shown in FIGS. 7 and 8 is arranged in a furnace, the mounting/drives 7b being located outside the furnace, i.e. "in the cold".

The rollers 8b or 9b of the forming rods 8 or 9 and the rollers 26 of the lateral guide for the glass sheets 25' or the transport rollers 7a (and 7d) may be made from compacted silicate fibrous material of high compressive strength, high resistance to abrasion and high temperature resistance. The material Calit 434 of the company Segliwa GmbH, Wiesbaden, or an equivalent material, has been found particularly suitable for this purpose.

I claim:

1. An apparatus for two-dimensional bending of a glass sheet heated to softening temperature, which comprises:
    a roller hearth bending section having a frame with two lateral edge portions;
    a bearing beam rotatably mounted on each of the two lateral edge portions of the bending section;
    a plurality of elongated straight transport rods in said roller hearth bending section and forming a planar horizontal support surface for a planar glass sheet and for moving the glass sheet into said roller hearth bending section, a first end of each transport rod being rotatably mounted on one of said bearing beams and a second end of each transport rod extends inwardly of said bearing beam and is opposed to and spaced from a corresponding second end of a transport rod rotatably mounted on the other bearing beam, whereby said transport rods form a first roller hearth bending section surface extending across substantially the full distance between the bearing beams,
    a plurality of forming elements in said roller hearth bending section and spaced apart from each other in the direction of travel of the glass sheet, each of said forming elements being interposed between axially adjacent ones of said transport rods and adjustable to form an element of a two-dimensional forming surface corresponding to a desired arched contour of said glass sheet, and
    means for rotating the bearing beams whereby the transport rods are pivoted downwardly between and under the spaced apart forming elements and the forming elements form a second roller hearth bending section support surface corresponding to said desired arched contour of the glass sheet.

2. An apparatus according to claim 1, wherein the opposed second ends of each of said transport rods mounted on the respective bearing beams are laterally offset in a center region of said roller hearth from the opposed second ends of adjacent ones of said transport rods mounted on said respective bearing beams when said transport rods are horizontally disposed to form said first roller hearth bending section.

3. An apparatus according to claim 1, wherein the forming elements comprise flexible shafts and a plurality of rollers mounted on the flexible shafts.

4. An apparatus according to claim 3, further comprising bearing sleeves on the flexible shafts and providing support points for the flexible shafts, vertically movable lifting elements disposed beneath the forming elements and holding the bearing sleeves, whereby a desired bending form is achieved by setting the positions of the support points by moving the lifting elements.

5. An apparatus according to claim 4 further comprising means to adjust the position of the lifting elements starting in an initial undeformed position of the flexiable shafts up to a desired end position of the respective support points.

6. An apparatus according to claim 1, further comprising a cooling section following the bending section and provided with a plurality of curved elements for transporting an arched glass sheet from the bending section through the cooling section, said curved elements having substantially the same arched contour as the forming elements provided in the bending section of the apparatus.

7. An apparatus according to claim 6, wherein said curved elements include support points and said cooling section includes nozzle boxes and lifting elements attached to said support points and said nozzle boxes for vertically adjusting said support points and nozzle boxes to simultaneously change the form of the surface generated by the curved elements and the position of said nozzle boxes relative to that surface.

8. An apparatus according to claim 6, wherein said curved elements include support points and the cooling section includes means for vertically adjusting the support points, pivotal nozzle arms beneath the glass sheet between the curved elements, said nozzle arms having end pieces which are rotatable about an axis extending in the glass sheet transport direction, stop means connected to the support points of the curved elements, and said end pieces of said nozzle arms rest against stop means.

9. An apparatus according to claim 1, wherein said transport rods rotatably mounted on each respective bearing beam define a plane tangent to the two-dimensional forming surface formed by the forming elements after said transport rods are pivoted downward and the arched glass sheet is guided by the planes defined by said downwardly pivoted transport rods at each lateral edge region of the arched glass sheet.

10. An apparatus according to claim 1, further comprising a plurality of guide rollers for guiding the glass sheet at its lateral edges.

11. An apparatus according to claim 10, wherein an axis of each of the guide rollers is perpendicular to a corresponding edge surface of the glass sheet.

12. An apparatus according to claim 11, further comprising means to adjust the guide rollers in the direction of their axes for adaptation of the guide rollers to the thickness of a particular glass sheet.

13. An apparatus according to claim 10, further comprising means to adjust the guide rollers in the axial direction of the transport rods.

14. An apparatus according to claim 13, wherein said guide rollers at each lateral edge of the glass sheet are mounted on a common support and said guide roller adjustment means includes means connecting said common support with said means for rotating the bearing beams whereby said common support moves in response to rotation of said bearing beams, and means for controlling movement of the guide rollers relative to the lateral edges of the glass sheet in response to pivot movement of the transport rods.

* * * * *